(12) United States Patent
Matthews

(10) Patent No.: US 8,421,844 B2
(45) Date of Patent: Apr. 16, 2013

(54) APPARATUS FOR CORRECTING GAZE, A METHOD OF VIDEOCONFERENCING AND A SYSTEM THEREFOR

(75) Inventor: Kim N. Matthews, Warren, NJ (US)

(73) Assignee: Alcatel Lucent, Paris (FR)

( * ) Notice: Subject to any disclaimer, the term of this patent is extended or adjusted under 35 U.S.C. 154(b) by 299 days.

(21) Appl. No.: 12/856,391

(22) Filed: Aug. 13, 2010

(65) Prior Publication Data

US 2012/0038741 A1 Feb. 16, 2012

(51) Int. Cl.
*H04N 7/14* (2006.01)
(52) U.S. Cl.
USPC ............... 348/14.16; 348/14.08; 348/14.12
(58) Field of Classification Search ..... 348/14.01–14.16
See application file for complete search history.

(56) References Cited

U.S. PATENT DOCUMENTS

| | | | |
|---|---|---|---|
| 5,400,069 A | 3/1995 | Braun et al. | |
| 5,438,357 A | 8/1995 | McNelley | |
| 5,500,671 A | 3/1996 | Andersson et al. | |
| 5,537,232 A | 7/1996 | Biles | |
| 5,801,758 A * | 9/1998 | Heirich | 348/14.16 |
| 6,323,984 B1 | 11/2001 | Trisnadi | |
| 6,340,230 B1 | 1/2002 | Bryars et al. | |
| 6,385,352 B1 | 5/2002 | Roustaei | |
| 6,392,766 B1 | 5/2002 | Gnaedig et al. | |
| 6,791,739 B2 | 9/2004 | Ramanujan et al. | |
| 6,882,358 B1 * | 4/2005 | Schuster et al. | 348/14.16 |
| 6,926,850 B2 | 8/2005 | Bolle | |
| 7,034,866 B1 | 4/2006 | Colmenarez et al. | |
| 7,239,879 B2 | 7/2007 | Avidor et al. | |
| 7,370,972 B2 | 5/2008 | Morikawa et al. | |
| 7,440,158 B2 | 10/2008 | Giles et al. | |
| 7,763,546 B2 | 7/2010 | Kothari et al. | |
| 7,808,540 B2 | 10/2010 | Cok | |
| 8,154,582 B2 | 4/2012 | Border et al. | |
| 2002/0063774 A1 | 5/2002 | Hillis et al. | |
| 2004/0239880 A1 | 12/2004 | Kapellner et al. | |
| 2005/0099605 A1 | 5/2005 | Buchner | |
| 2005/0231734 A1 | 10/2005 | Johannesson et al. | |
| 2006/0007222 A1 | 1/2006 | Uy | |
| 2007/0002130 A1 | 1/2007 | Hartkop | |
| 2007/0046907 A1 | 3/2007 | Shin | |
| 2007/0120879 A1 | 5/2007 | Kanade et al. | |

(Continued)

FOREIGN PATENT DOCUMENTS

| | | |
|---|---|---|
| EP | 0385128 | 9/1990 |
| EP | 0812106 | 12/1997 |

(Continued)

OTHER PUBLICATIONS

J.W. Goodman, "Some Fundamental Properties of Speckle" Journal of the Optical Society of America, vol. 66, No. 11, pp. 1145-1150, Nov. 1976.

(Continued)

*Primary Examiner* — Melur Ramakrishnaiah
(74) *Attorney, Agent, or Firm* — Hitt Gaines, PC

(57) ABSTRACT

An apparatus, a method of videoconferencing and a videoconferencing system are disclosed herein. In one embodiment, the apparatus includes: (1) a monitor configured to switch between a display mode and a reflecting mode and (2) a camera located in front of the monitor, the camera positioned to face the monitor and synchronized with the monitor to capture a local image reflected therefrom during the reflecting mode.

20 Claims, 3 Drawing Sheets

U.S. PATENT DOCUMENTS

| | | | |
|---|---|---|---|
| 2007/0247417 | A1 | 10/2007 | Miyazaki et al. |
| 2007/0273839 | A1 | 11/2007 | Doi et al. |
| 2008/0012936 | A1 | 1/2008 | White |
| 2008/0212034 | A1 | 9/2008 | Aksyuk et al. |
| 2008/0212040 | A1 | 9/2008 | Aksyuk |
| 2008/0219303 | A1 | 9/2008 | Chen et al. |
| 2009/0041298 | A1 | 2/2009 | Sandler et al. |
| 2009/0122572 | A1 | 5/2009 | Page et al. |
| 2009/0184659 | A1 | 7/2009 | Chen et al. |
| 2009/0184976 | A1 | 7/2009 | Chen et al. |
| 2009/0185140 | A1 | 7/2009 | Chen et al. |
| 2009/0185141 | A1 | 7/2009 | Chen et al. |
| 2009/0185251 | A1 | 7/2009 | Chen et al. |
| 2010/0039380 | A1 | 2/2010 | Lanier |
| 2010/0073456 | A1 | 3/2010 | Bolle |
| 2010/0173436 | A1 | 7/2010 | Ouellet et al. |
| 2010/0174443 | A1 | 7/2010 | Kubota et al. |
| 2010/0302344 | A1* | 12/2010 | Large et al. ............... 348/14.08 |

FOREIGN PATENT DOCUMENTS

| | | | |
|---|---|---|---|
| EP | 1018041 | A | 7/2000 |
| EP | 1176803 | A1 | 1/2002 |
| EP | 1283434 | A2 | 2/2003 |
| EP | 1571467 | A2 | 9/2005 |
| EP | 1640799 | A1 | 3/2006 |
| EP | 1734771 | A1 | 12/2006 |
| WO | 0047001 | A1 | 8/2000 |
| WO | 2004064410 | A1 | 7/2004 |
| WO | 2007029649 | A1 | 3/2007 |
| WO | 2007138542 | | 12/2007 |

OTHER PUBLICATIONS

SC Kerigan, et al, "Perceived Speckle Reduction in Projection Display Systems" IP.com Journal, IP.com Inc., West Henrietta, NY, pp. 9-11, Jul. 1, 1997, XP-013106711.

"DC-DC Converted Basics" published on line at: http://www.powerdesigners.com/InfoWeb /design_center/articles/DC-DC/converter.shtm; 12 pages.

Greywall, Dennis S., et al.; "Crystalline Silicon Tilting Mirrors for Optical Cross-Connect Switches"; Journal of Microelectromechanical Systems, vol. 12, No. 5, Oct. 2003, pp. 708-712.

"S-334—Ultra-Long-Range Piezo Tip/Tilt Mirror"; Moving the NanoWorld, www.pi.we; 2 Pages.

Rickers, et al.; "Design and manufacture of spectrally selective reflecting coatings for the use with laser display projection screens;" Applied Optics, OSA, Optical Society of America, Washington, DC; vol. 41, No. 16, Jun. 1, 2002, pp. 3097-3106; XP-002346084.

M. Gross et al, "blue-c: A Spatially Immersive Display and 3D Video Portal for Telepresence", project webpage: http://bluec.ethz.ch/,ACM 0730-0301/03/0700-0819, (2003) pp. 819-827.

M. Kuechler et al, "HoloPort—A Device for Simultaneous Video and Data Conferencing Featuring Gaze Awareness", In Proceedings of the 2006 IEEE Virtual Reality Conference (VR '06). (2006) pp. 81-87.

S. Izadi et al, "Going Beyond the Display: A Surface Technology with an Electronically Switchable Diffuser", UIST '08, (Oct. 19-22, 2008), Monterey, CA, pp. 269-278.

H. Ishii et al, "ClearBoard: A Seamless Medium for Shared Drawing and Conversation with Eye Contact", CHI '92, (May 3-7, 1992), pp. 525-532.

K-H Tan et al, "ConnectBoard: A remote collaboration system that supports gaze-aware interaction and sharing", 2009 IEEE International Workshop on Multimedia Signal Processing, MMSP '09, (Oct. 5-7, 2009), 6 pages.

S. Shiwa et al, "A Large-Screen Visual Telecommunication Device Enabling Eye Contact", SID 91 Digest, ISSN0097-0966x/91/0000-327 (1991), pp. 327-328.

C. Bolle et al, "Videoconferencing Terminal With a Persistence of Vision Display and a Method of Operation Thereof to Maintain Eye Contact", filed Dec. 17, 2009, U.S. Appl. No. 12/640,998, 36 pages.

C. Bolle et al, "Imaging Terminal", filed Dec. 8, 2009, U.S. Appl. No. 12/633,656, 22 pages.

Matthews; U.S. Appl. No. 12/855,186; "A Gaze Correcting Apparatus, a Method of Videoconferencing and a Videoconferencing System"; filed Aug. 12, 2010.

"How mirasol Displays Work: Micro-electro-mechanical Systems (MEMS) Drive IMOD Reflective Technology," www.mirasoldisplays.com/mobile-display-imod-technology, 1 page.

"Electrophoresis," Liquid Crystals & Photonics Group—Ghent University (Belgium), http://trappist.elis.ugent.be/elisgroups/lcd/research/elektink.php, Aug. 9, 2010, 12 pages.

"TFT LCD Specification," Pixel Qi, Doc No. PQ003, Issued Date: Jun. 28, 2010, Model No. PQ 3Qi-01, Version 1.0, 23 pages.

* cited by examiner

APPARATUS FOR CORRECTING GAZE, A METHOD OF VIDEOCONFERENCING AND A SYSTEM THEREFOR

TECHNICAL FIELD

This application is directed, in general, to interactive video displays, such as, a videoconferencing terminal.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Communication via computer networks frequently involves far more than transmitting text. Computer networks, such as the Internet, can also be used for audio communication and visual communication. Still images and video are examples of visual data that may be transmitted over such networks.

One or more cameras may be coupled to a computing device, such as a personal computer (PC), to provide visual communication. The camera or cameras can then be used to transmit real-time visual information, such as video, over a computer network. Dual transmission can be used to allow audio transmission with the video information. Whether in one-to-one communication sessions or through videoconferencing with multiple participants, participants can communicate via audio and video in real time over a computer network (i.e., voice-video communication).

During video conferences, the cameras and images of remote users are physically separate. This leads to participants appearing not to look at the camera but to an off-axis location, which many video conferencing participants find uncomfortable and annoying. This gaze misdirection is often cited as one of the major subjective issues in conferencing, especially during one on one meetings. This problem requires that, relative to the user, the direction of the image of the remote user and the direction of the camera should be coincident, which is generally impractical.

SUMMARY

One aspect provides an apparatus. In one embodiment, the apparatus includes: (1) a monitor configured to switch between a display mode and a reflecting mode and (2) a camera located in front of the monitor, the camera positioned to face the monitor and synchronized with the monitor to capture a local image reflected therefrom during the reflecting mode.

In another embodiment, a method of videoconferencing is disclosed. In one embodiment, the method includes: (1) switching a monitor between a display mode and reflecting mode and (2) capturing a local image reflected from the monitor during the reflecting mode employing a camera, the camera located in front of the monitor and positioned to face the monitor.

In yet another embodiment, a videoconferencing system is disclosed. In one embodiment, the videoconferencing system includes a first videoconferencing terminal connectable to support a videoconferencing session video with a second videoconferencing terminal via a telecommunications network, wherein the first terminal has: (1) a microphone configured to generate an audio signal based on acoustic energy received thereby, (2) a speaker configured to generate acoustic energy based on an audio signal received thereby, (3) a monitor configured to switch between a display mode and a reflecting mode and (4) a camera located in front of the monitor, the camera positioned to face the monitor and synchronized with the monitor to capture a local image reflected therefrom during the reflecting mode.

BRIEF DESCRIPTION

Reference is now made to the following descriptions of embodiments, provided as examples only, taken in conjunction with the accompanying drawings, in which.

DETAILED DESCRIPTION

Figure 1:
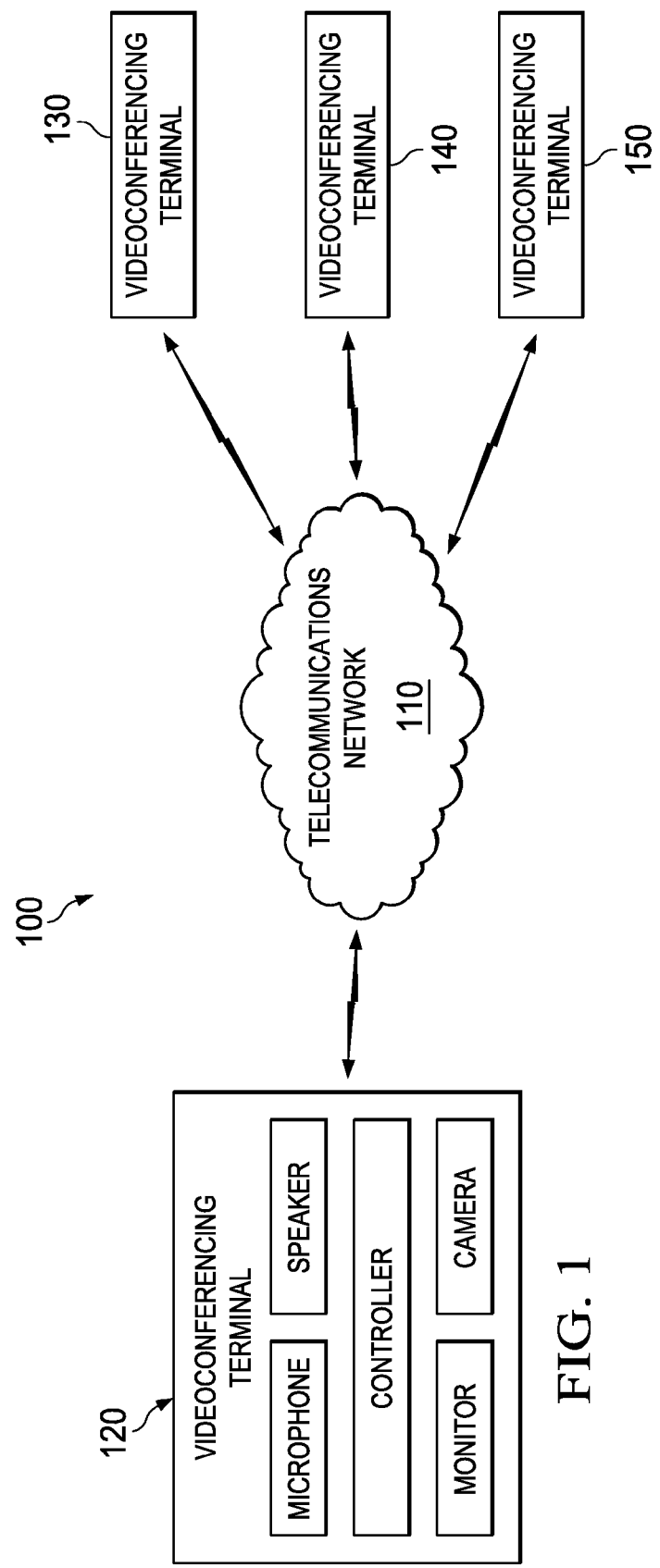
FIG. 1 is a schematic block diagram of an embodiment of a videoconferencing infrastructure within which a videoconferencing terminal constructed according to the principles of the disclosure may operate.

Even with voice-video communication, videoconferencing sessions can seem rigid with strained interaction between participants. To improve interaction and provide an immersive feel for users, various devices have been used. These conventional devices, however, may be distracting to users, may cause poor image quality or may increase the size of a monitor to uncomfortable proportions.

This disclosure provides an apparatus for correcting the gaze of a user. The disclosed apparatus, such as a computer terminal, employs the front surface or screen of a monitor (e.g., a liquid crystal display (LCD) monitor) as a low efficiency mirror and a camera (e.g., a video camera) located either above, below or to the side of the monitor to capture an image of the user. The light source illumination of the monitor is deactivated when the camera captures images. The light source illumination may be synchronously strobed with the exposures of the camera. The high strobe rate, for example at a frequency of 120 Hz, of the monitor's light source can essentially make the strobe effect undetectable by a user, while timing the exposures of the camera with the "off" state of the light source ensures that the camera images do not include visual data originating from the monitor itself (e.g., a remote image being displayed on the monitor). The disclosed apparatus may be a computer terminal that is used for videoconferencing (i.e., a videoconferencing terminal).

As disclosed herein, the camera may be positioned in front of a user and pointing towards the monitor. The monitor may be placed at a normal position in front of the user, pointing slightly downwards. The image of the user is displayed on the monitor (i.e., the user image is reflected therefrom) and aligned such that the user appears to be looking directly towards the camera. The user's image that is captured by the camera is enhanced by synchronizing the capturing of the reflected image with the deactivation of the light source illumination of the monitor. The monitor may be a LCD monitor used with a controller or computing device to effectively time interlace a regular image and a black image. A synchronization signal from, for example, the controller, may be used to time the exposures of the camera and the operation of the light source. The controller may be integrated with the monitor, the camera or may be an independent computing device that provides the synchronization signal to the monitor and the camera.

In some embodiments, the synchronization signal could be transmitted wirelessly and broadcast to multiple monitors and/or other devices in the room, such as environmental light systems. In some embodiments, the synchronization signal can be used to control other environmental effects associated with the monitor and camera. For example, the lighting of a user's face can improve the captured image of the user, but the glare of lights in the face is uncomfortable. As such, the lighting of the user's face could be timed to be synchronized with the camera exposures and off at other times. This would improve the efficiency of the lighting and generally reduce the perceived brightness of the lights by around fifty percent. Similarly, the ambient lighting of the room could be synchronized to appear normal to the local viewer, but "off" to the camera.

FIG. 1 is a schematic block diagram of one embodiment of a videoconferencing infrastructure 100 within which a videoconferencing terminal constructed according to the principles of the disclosure may operate. This embodiment of the videoconferencing infrastructure 100 is centered about a telecommunications network 110 that is employed to interconnect two or more videoconferencing terminals 120, 130, 140, 150 for communication of video signals or information, and perhaps also audio signals or information, therebetween. An alternative embodiment of the videoconferencing infrastructure 100 is centered about a computer network, such as the Internet. Still another embodiment of the videoconferencing infrastructure 100 involves a direct connection between two videoconferencing terminals, e.g., connection of the videoconferencing terminals 120, 130 via a plain old telephone (POTS) network. As represented in the videoconferencing terminal 120, the videoconferencing terminals 120, 130, 140, 150, may include components typically included in a conventional videoconferencing terminal, such as, a microphone, a speaker, a monitor and controller. Additionally, the videoconferencing terminals 120, 130, 140, 150, may include a camera located in front of the monitor and positioned to face the monitor and capture an image reflected therefrom. The front or viewing side of the monitor is the screen-side of the monitor where displayed images are viewed.

The microphone can be configured to generate an audio signal based on acoustic energy received thereby, and the speaker can be configured to generate acoustic energy based on an audio signal received thereby. The monitor can include a display screen that provides a visual output and the controller can be configured to direct the operation of the terminal. Unlike conventional terminals, the controller may also be configured to provide a synchronization signal to control operation of the camera with the light source of the monitor. The videoconferencing terminals 120, 130, 140, 150, may be computer terminals, including but not limited to, a personal computer, a laptop, a computing pad, a personal digital assistant (PDQ) or a mobile telephone.

Figure 2:
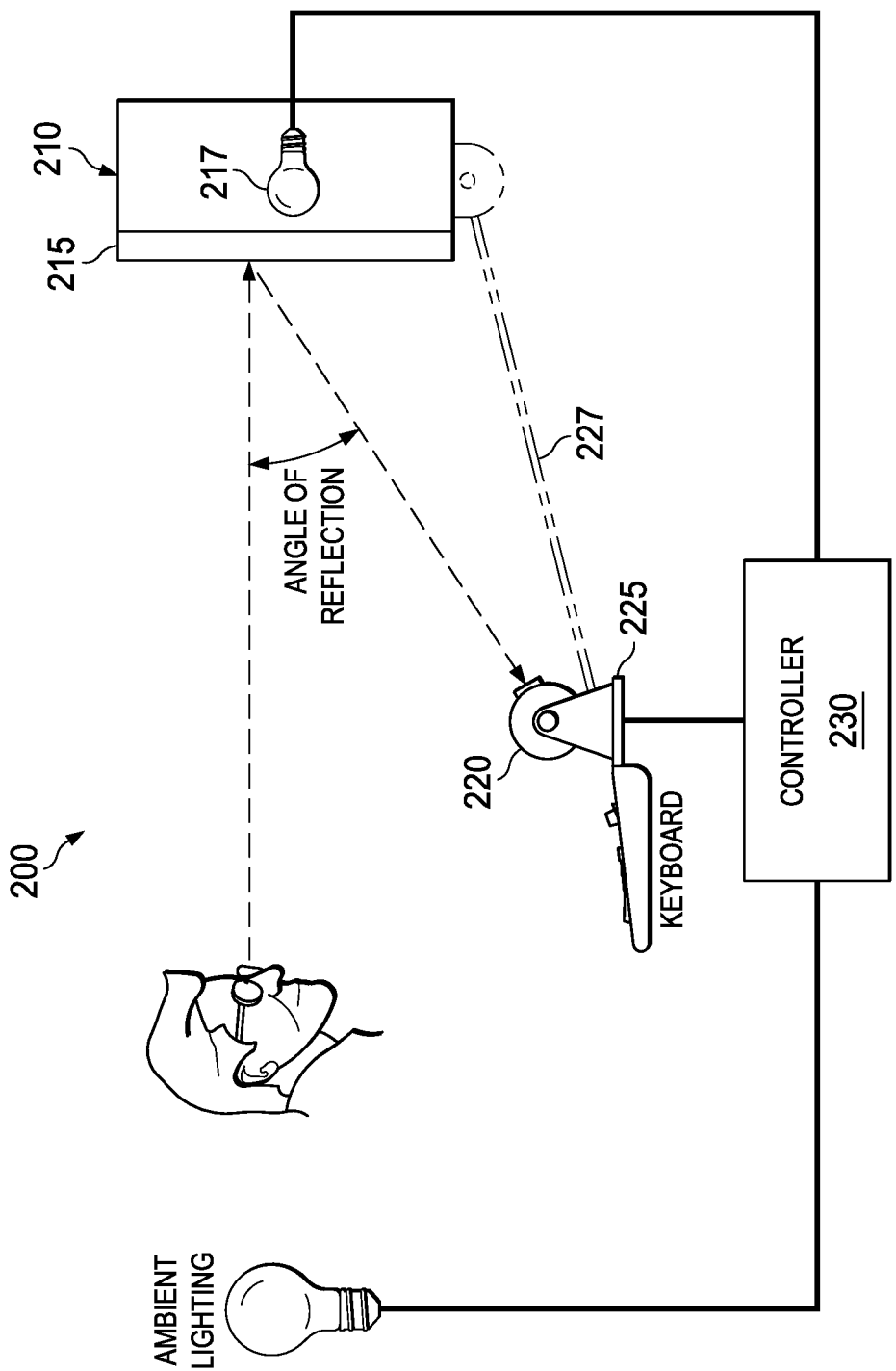
FIG. 2 is a side elevation view of an embodiment of a videoconferencing terminal, e.g., of the videoconferencing infrastructure of FIG. 1, constructed according to the principles of the disclosure.

FIG. 2 is a side elevation view of an embodiment of a videoconferencing terminal 200, e.g., of the videoconferencing infrastructure of FIG. 1, constructed according to the principles of the disclosure. The videoconferencing terminal 200 includes a monitor 210, a camera 220 and an exposure controller 230.

The monitor 210 includes a screen 215 and a light source 217 (e.g., a backlight) and is configured to provide an image for viewing, such as, a remote image communicated over the telecommunications network 110 of FIG. 1 from a remote videoconferencing terminal. The remote image may be from a first location that is a remote location from the monitor 210 which is at a second location. In some embodiments, the first location and the second location may be located proximate each other. For example, the first location and the second location may be located in the same building or may be separated by a wall.

The monitor 210 may be a flat panel display (FPD) monitor. In one embodiment, the monitor 210 is a LCD monitor. In an alternative embodiment, the monitor 210 is a liquid-crystal-on-silicon (LCoS) monitor. In further alternative embodiments, the monitor 210 is another conventional or later-developed FPD technology that employs a light source to provide images for viewing. Those skilled in the pertinent art understand the structure and operation of conventional FPDs having a display screen and a light source.

The monitor 210 is configured to switch between a display mode and a reflecting mode. In the display mode, the monitor 210 provides an image for viewing as in a conventional monitor. In the display mode, the light source 217 is activated to provide the image on the screen 215. In the reflecting mode, the light source 217 of the monitor is deactivated to provide a black surface at the screen 215 to reflect a user image to be captured by the camera 220.

The camera 220 is located in front of the monitor 210 and positioned to face the monitor 210 and capture an image reflected therefrom during the reflection mode. The camera 220 may be a conventional webcam. The local image may be the face of a local user in front of the monitor 210. The local user may be, for example, employing the monitor 210 for a videoconferencing session or recording a video blog. The camera 220 may be coupled to the monitor 210 via conventional audio-video cable (not shown) to transmit the captured image to the monitor 210 for, for example, transmission to another terminal for video conferencing. Wireless connections may also be employed.

The camera 220 includes a base 225 that is designed to support the camera 220 and allow the camera 220 to be tilted to adjust the field of view. One skilled in the pertinent art will understand the structure and operation of a base that allows the field of view of the camera 220 to be adjusted. The field of view may be adjusted to align with the angle that the local image is reflected (i.e., the angle of reflection) from the monitor 210.

As illustrated in FIG. 2, the camera 220 may be coupled to a keyboard associated with the monitor 210. The camera 220 may be coupled to the keyboard via a conventional means. The camera 220 may also be fastened to the monitor 210 via an arm 227 as indicated by the dashed line in FIG. 2. The distance the camera 220 is extended from the monitor 210 or positioned in front of the monitor 210 may be based on the type of monitor 210 (e.g., the size of the monitor 210). The distance may be known based on experimentation. In some embodiments, a particular distance for various types of monitors may be marked on the arm 227 to position the camera 220. The arm 227 may be mechanically coupled to the monitor 210 through conventional means and may be attached at various locations on the monitor 210 that allow the camera 220 to be positioned in front of the monitor 210. For example with respect to the monitor 210, the arm 227 may support the camera 220 from the bottom of the monitor 210. In other embodiments, the arm 227 may support the camera 210 from sides of the monitor 210 of from the top of the monitor 210. Additionally, the camera 220 may be attached to the top side of the keyboard, to the left side or, as illustrated, to the right side of the keyboard.

The exposure controller 230 is configured to provide a timing signal that synchronizes the camera 220 to capture the reflected image during the reflecting mode. As such, the exposure controller 230 may operate switches to control the illumination of the screen 215 to alternate between the display mode and the reflecting mode. The exposure controller 230 may be a computing device that is external to the monitor 210 and the camera 220 as illustrated in FIG. 2. Additionally, as indicated by the dashed boxes in the monitor 210 and the camera 220, the exposure controller 230 may be integrated with the monitor 210 or the camera 220. As such, the exposure controller 230 may be integrated with a controller of the monitor 210 or a controller of the camera 220. For example, the exposure controller 230 may be a processor typically included in an array-type LCD device that in addition to the various functions typically performed, such as directing the backplane for LCD pixels, is configured to perform the functions described herein.

The exposure controller 230 may be configured to direct the light source 217 to cycle between a display mode (an illumination cycle) and a reflecting mode (a black cycle). During the display mode, the light source 217 is on and the display pixels are illuminated. During the reflecting mode, the light source 217 is off and an image is reflected from the black screen. The percentage of time where the light source 217 is on versus when the light source 217 is off can vary in different embodiments depending on the efficiency of the image sensors. In some embodiments, the light source 217 is cycled off 10% or about 10% of the time. In other embodiments, the light source 217 may cycle off up to or about to 50% of the time. The exposure controller 270, therefore, may direct the light source 217 to cycle off within a range of 10% to 50% of the time. In some embodiments, the exposure controller 270 may direct the light source 217 to cycle off greater than 50% of the time. Increasing the reflection time may improve camera signal-to-noise ratio while decreasing the reflection time may reduce the apparent brightness of any environmental illumination. As such, both increasing and decreasing the reflection time can be beneficial depending on the various environments.

In one embodiment, the exposure controller 230 provides the timing signal to switch the monitor 210 between the display mode and the reflecting mode at a frequency of 120 Hertz. In other embodiments, the timing signal may be generated at different frequencies. The switching between the display mode and the reflecting mode, however, is performed to minimize or completely reduce detection of the switching by the user.

The exposure controller 230 may be one of various conventional digital data processors that are programmed or store executable programs of sequences of software instructions to perform one or more of the above functions. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the above described functions.

In addition to synchronizing the operation of the light source 217 and the camera 220, the timing signal generated by the exposure controller 230 may also be employed to control operation of environmental effects associated with the monitor or the camera. The environmental effects may include ambient lighting wherein the ambient lighting is turned off during the reflecting mode. The environmental effects, including the ambient lighting, may be coupled to the exposure controller 230 through a wired connection as indicated in FIG. 2. In other embodiments, the connection may be wireless. Both the wireless and wired connections, for these and other connections associated with the exposure controller 230, may be via conventional means.

As noted above, the exposure controller 230 may alternate on/off images at a frequency of 120 Hz. In one embodiment, the exposure controller 230 may be a video adaptor that generates an electrical synchronization signal as the timing signal to control exposure time of the camera 220 to correspond with the frequency of the images being displayed. The video adaptor may be a Nvidia Quadro 570. In alternative embodiments, images may be continuously displayed on the monitor 210 and the timing signal may be used to synchronously enable strobing of the light source 217 (e.g., a LCD backlight) with exposures of the camera 220.

Figure 3:
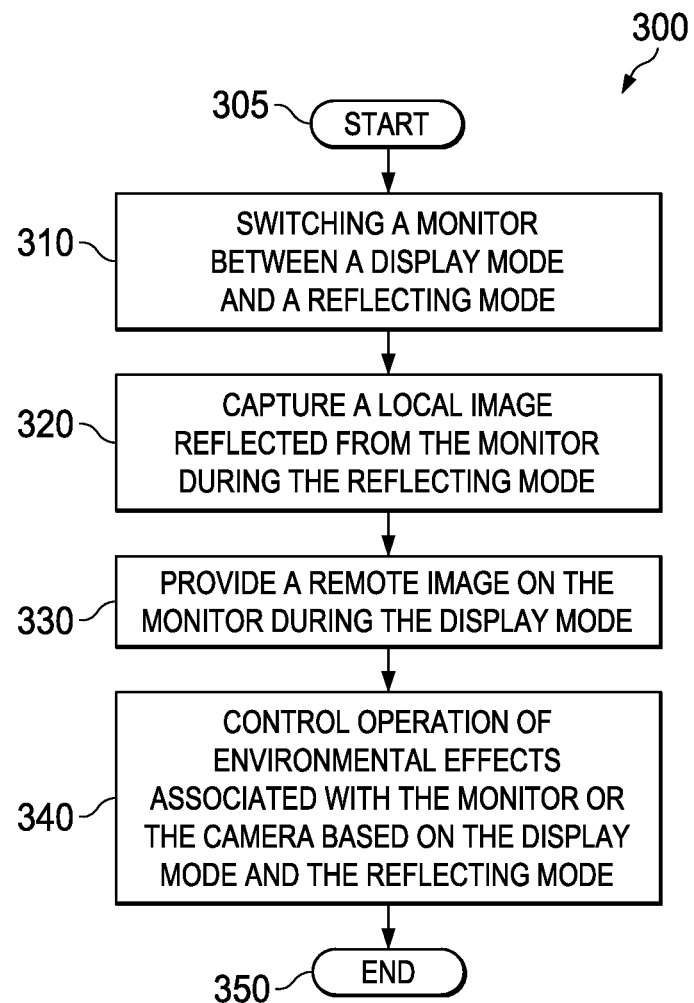
FIG. 3 is a flow diagram of one embodiment of a method of videoconferencing carried out according to the principles of the disclosure.

FIG. 3 is a flow diagram of one embodiment of a method of videoconferencing carried out according to the principles of the disclosure. A videoconferencing terminal including a monitor and a camera as described with respect to FIG. 1 or FIG. 2 may be employed for the method 300. The method begins in a step 305.

In a step 310, a monitor is switched between a display mode and a reflecting mode. Switching between the modes may be controlled by a timing signal. The timing signal may be generated by an exposure controller. In some embodiments, the exposure controller may be integrated with a monitor or a camera.

During the reflecting mode, a local image reflected from the monitor (i.e., a screen of the monitor) is captured in a step 320. The local image may be captured by a camera located in front of the monitor and positioned to face the monitor. The local image is reflected from the monitor at an angle of reflection and the camera captures the local image at the angle of reflection. The camera may be mechanically coupled to the monitor. The local image can be captured to be displayed at another location. As such, users at different locations may participate in a video conference. For example, the local image may be of a local user of the monitor and the camera is positioned between the local user and the monitor. During the reflecting mode, the light source of the monitor is deactivated by the timing signal. This reduces or eliminates light originating from the monitor.

In a step 330, a remote image is provided on the monitor during the display mode. While providing the remote image, the light source of the monitor is activated by the timing signal. As such, operation of the light source of the monitor is synchronized with the reflecting and display modes. In one embodiment, switching between the display mode and the reflecting mode may occur at a frequency of 120 Hertz.

In a step 340, operation of environmental effects associated with the monitor or the camera are controlled based on the display mode and the reflecting mode. The operation of the environmental effects may be controlled by the timing signal. The environmental effects may include ambient lighting for the monitor and camera. The method 300 then ends in a step 340.

Those skilled in the art to which the application relates will appreciate that other and further additions, deletions, substitutions and modifications may be made to the described embodiments. Additional embodiments may include other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus, comprising:
   a monitor configured to switch between a display mode and a reflecting mode; and
   a camera located in front of said monitor, said camera positioned to face said monitor and synchronized with said monitor to capture a local image reflected therefrom during said reflecting mode.

2. The apparatus as recited in claim 1 further comprising an exposure controller configured to provide a timing signal that synchronizes said capture with said reflecting mode.

3. The apparatus as recited in claim 2 wherein said exposure controller is associated with said monitor.

4. The apparatus as recited in claim 1 wherein said monitor switches between said display mode and said reflecting mode at a frequency of 120 Hertz.

5. The apparatus as recited in claim 1 wherein said monitor is a LCD monitor having a light source and said light source is activated during said display mode and said light source is deactivated during said reflecting mode.

6. The apparatus as recited in claim 1 wherein a timing signal is employed to control switching between said display mode and said reflecting mode and employed to control operation of environmental effects associated with said monitor or said camera.

7. The apparatus as recited in claim 6 wherein said environmental effects include ambient lighting for said apparatus and said ambient lighting is turned off during said reflecting mode.

8. A method of videoconferencing, comprising:
   switching a monitor between a display mode and reflecting mode; and
   capturing a local image reflected from said monitor during said reflecting mode employing a camera, said camera located in front of said monitor and positioned to face said monitor.

9. The method as recited in claim 8 further comprising providing a timing signal to synchronize said capturing with said reflecting mode.

10. The method as recited in claim 9 wherein said timing signal is generated by an exposure controller associated with said monitor.

11. The method as recited in claim 8 wherein said switching between said display mode and said reflecting mode occurs at a frequency of 120 Hertz.

12. The method as recited in claim 8 wherein said monitor is a LCD monitor having a light source and said switching includes activating said light source during said display mode and deactivating said light source during said reflecting mode.

13. The method as recited in claim 8 further comprising employing a timing signal to control switching between said display mode and said reflecting mode and employing said timing signal to control operation of environmental effects associated with said monitor or said camera.

14. The method as recited in claim 13 wherein said environmental effects include ambient lighting for said apparatus, said method further comprising deactivating said ambient lighting during said reflecting mode.

15. A videoconferencing system, comprising:
    a first videoconferencing terminal connectable to support a videoconferencing session video with a second videoconferencing terminal via a telecommunications network, wherein said first terminal includes:
       a microphone configured to generate an audio signal based on acoustic energy received thereby,
       a speaker configured to generate acoustic energy based on an audio signal received thereby,
       a monitor configured to switch between a display mode and a reflecting mode; and
    a camera located in front of said monitor, said camera positioned to face said monitor and synchronized with said monitor to capture a local image reflected therefrom during said reflecting mode.

16. The videoconferencing system as recited in claim 15 further comprising an exposure controller configured to provide a timing signal that synchronizes said capture with said reflecting mode.

17. The videoconferencing system as recited in claim 16 wherein said exposure controller is integrated with said monitor.

18. The videoconferencing system as recited in claim 15 wherein said monitor switches between said display mode and said reflecting mode at a frequency of 120 Hertz.

19. The videoconferencing system as recited in claim 15 wherein said monitor is a LCD having a light source and said light source is activated during said display mode and said light source is deactivated during said reflecting mode.

20. The videoconferencing system as recited in claim 15 wherein a timing signal is employed to control switching between said display mode and said reflecting mode and employed to control operation of environmental effects associated with said monitor or said camera.

* * * * *